July 4, 1939.  A. J. ISBELL  2,164,992
SYSTEM FOR PARKING VEHICLES
Filed Nov. 20, 1937  7 Sheets-Sheet 5
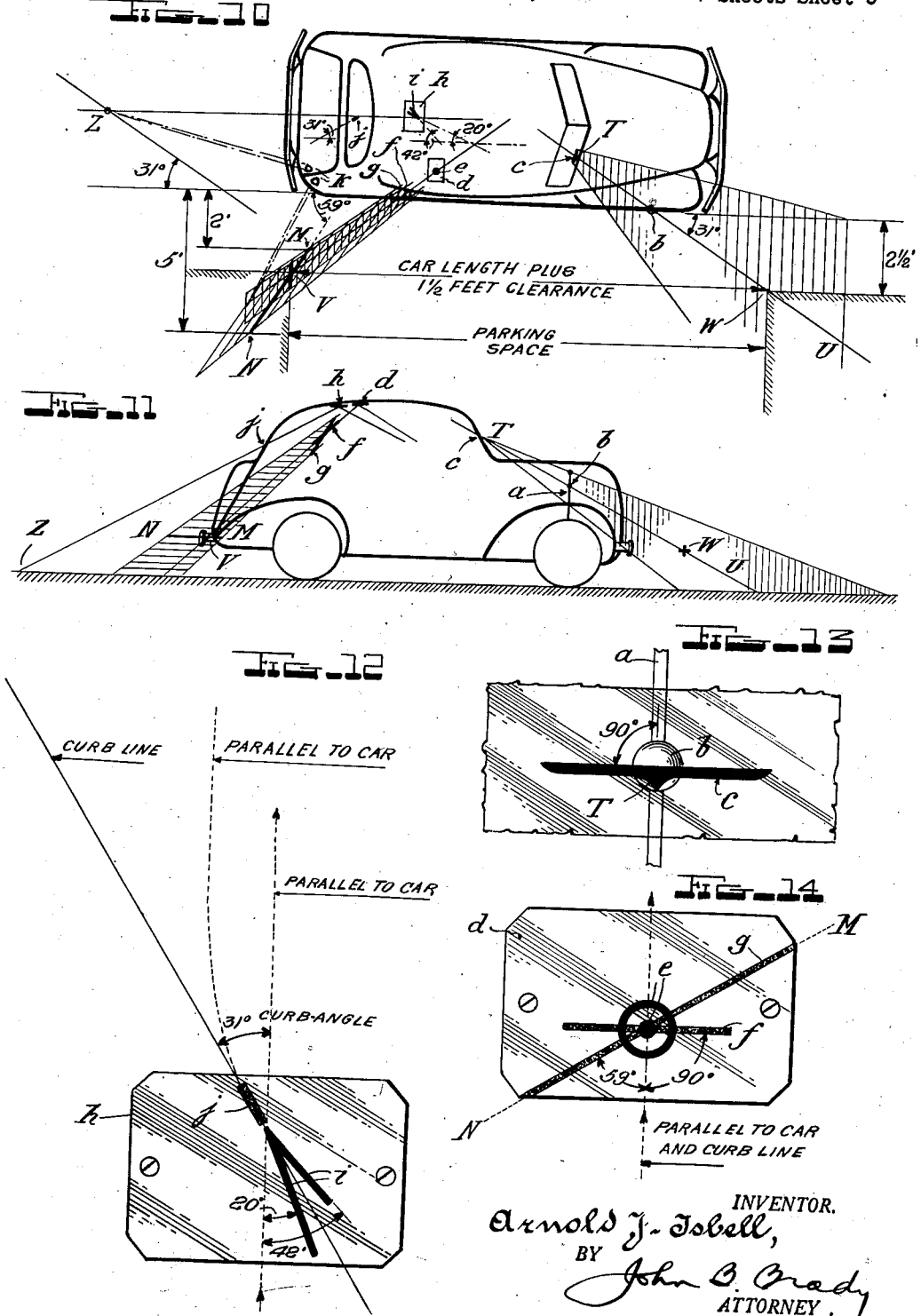

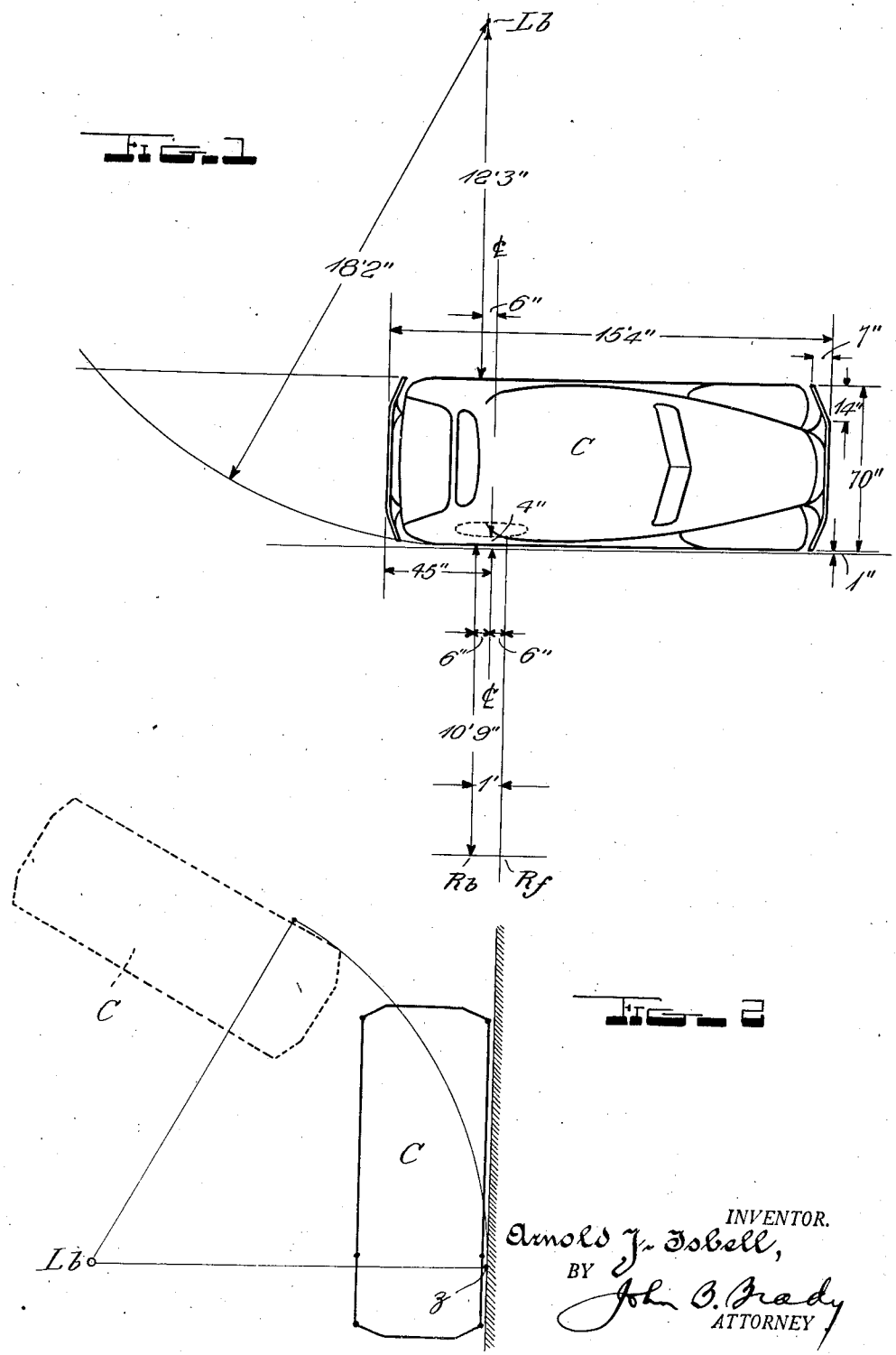

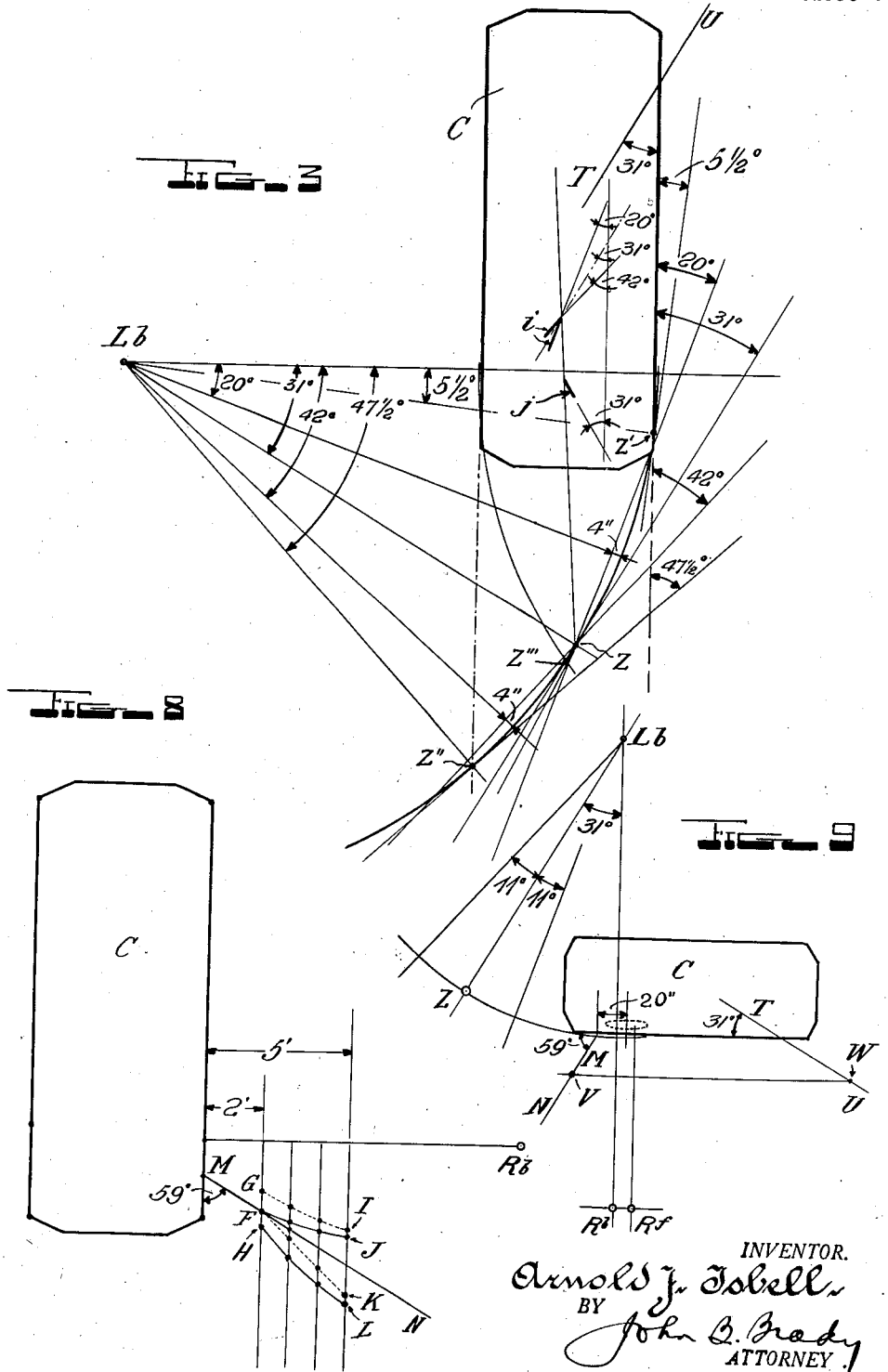

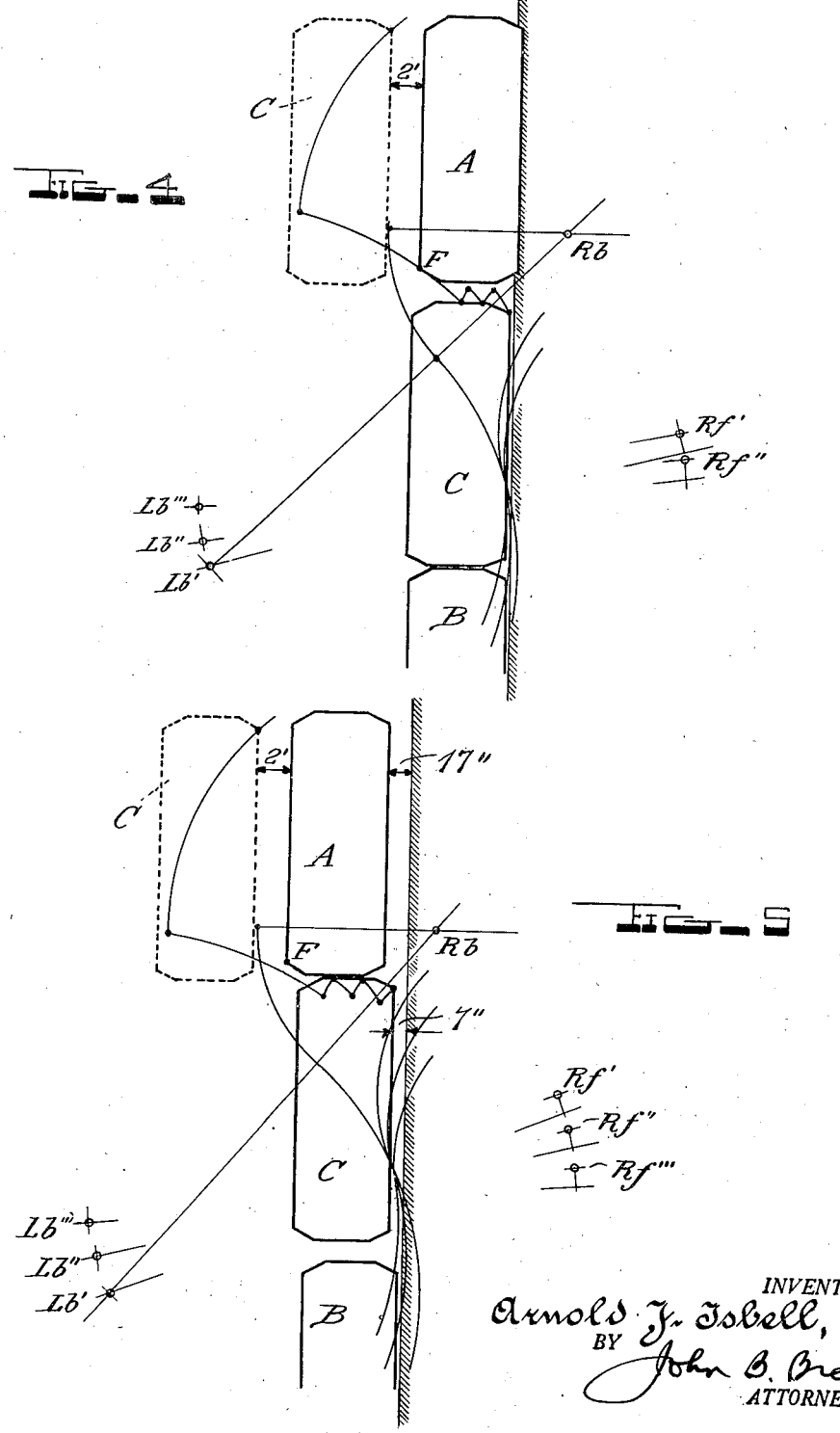

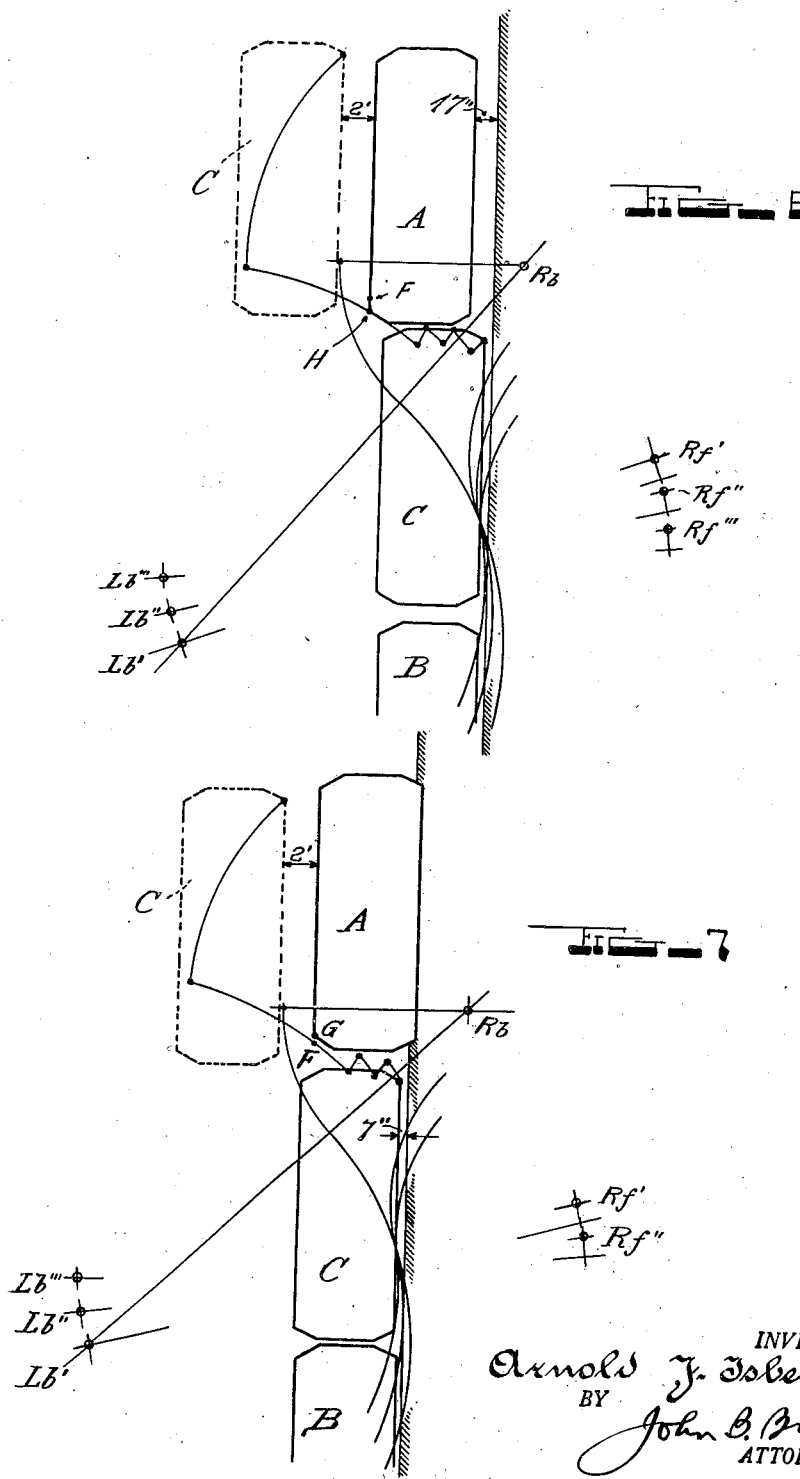

July 4, 1939.   A. J. ISBELL   2,164,992
SYSTEM FOR PARKING VEHICLES
Filed Nov. 20, 1937   7 Sheets-Sheet 6
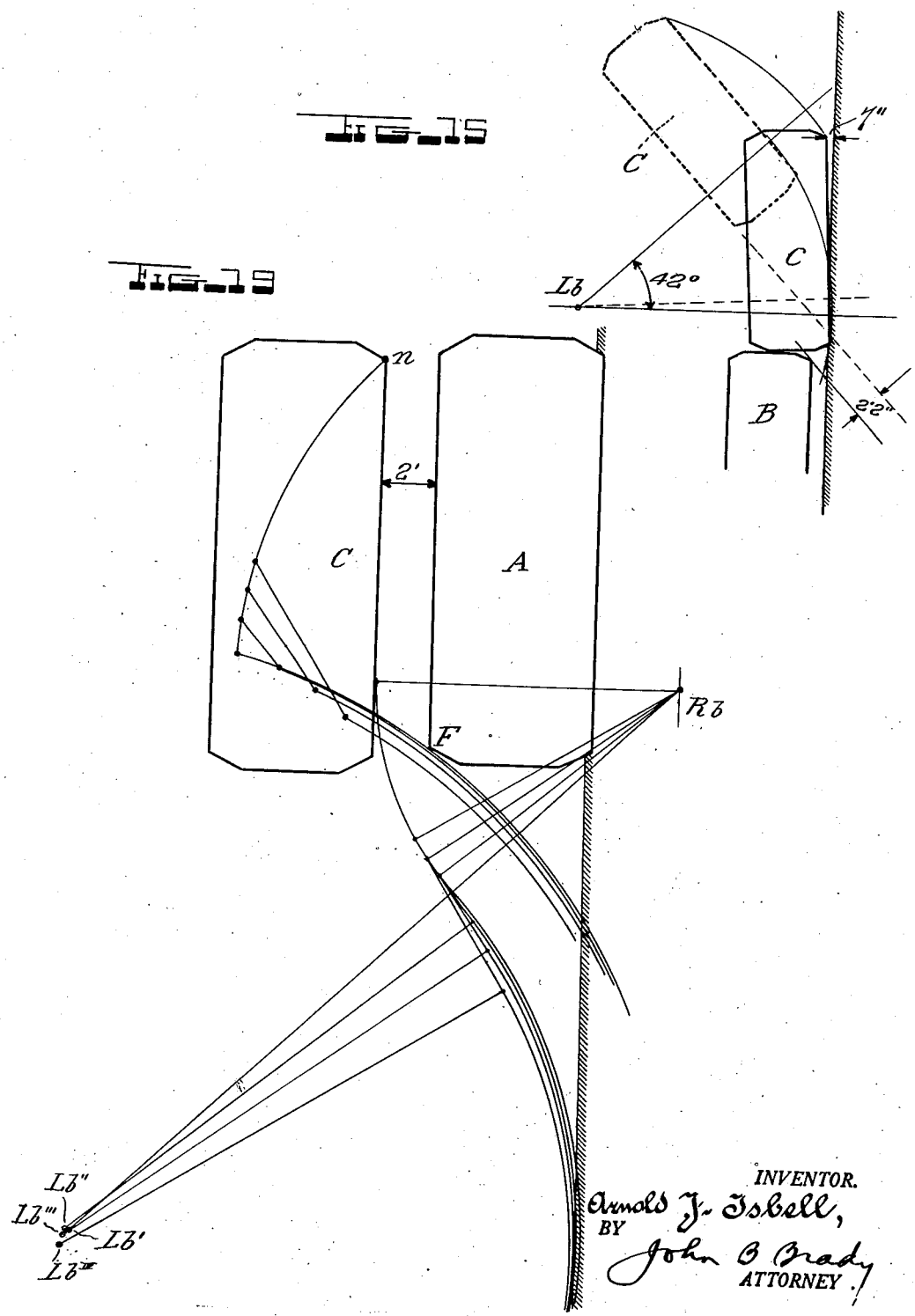
INVENTOR.
Arnold J. Isbell,
BY
John C. Brady
ATTORNEY.

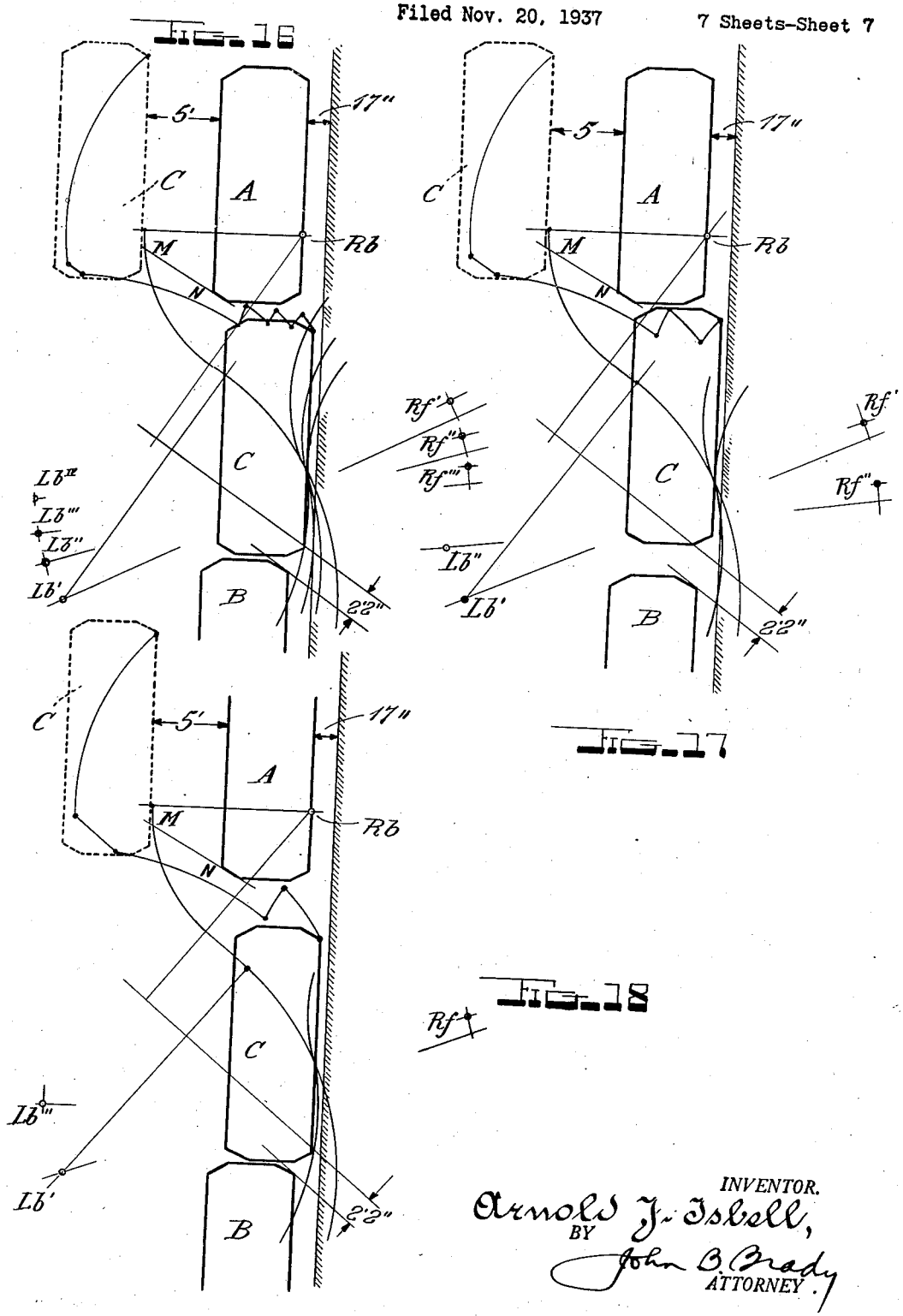

Patented July 4, 1939

2,164,992

UNITED STATES PATENT OFFICE 2,164,992

SYSTEM FOR PARKING VEHICLES

Arnold J. Isbell, Pensacola, Fla., assignor of one-half to Mary Elizabeth Arnold Isbell, Chicago, Ill.

Application November 20, 1937, Serial No. 175,711

16 Claims. (Cl. 88—86)

My invention relates broadly to vehicles and more particularly to automotive vehicles and methods and means for parking such vehicles in a satisfactory position relative to adjacent obstacles.

The generally prevalent manner of arbitrarily steering an automobile backward into a parking space, and subsequently zigzagging into a questionable final position, is well known. Prior art devices in this art have usually been directed to aiding the driver in viewing, from his seat within the vehicle, the space into which he is endeavoring to place the machine. From continued use, such devices may become of some aid to an experienced driver, but they are not provided with any basic conception of the geometric nature of the problem involved.

My invention relates to parking methods, and to certain coordinated devices which establish definite lines of sight from the driver's position, by which the automobile can be consistently and accurately parked in a minimum or larger space at a satisfactory distance from a curb or other limiting line.

My invention fundamentally conceives of constant minimum circles or arcs of rearward movement, and similar but differently centered arcs or circles of forward movement, for each part of an automobile when its steering wheels are disposed hard left or hard right. Based on such constant minimum turning circles, various methods and indicators may be devised for definitely locating a curb or like line as a tangent or near-tangent to the minimum left arc of rearward movement of some particular point relative to the automobile and the car can then be maneuvered precisely into a final parking position substantially parallel to the curb or like line and at a satisfactory resulting distance therefrom.

One of the objects of my invention therefore, is to provide a method of parking a vehicle wherein the vehicle is definitely located relative to a limiting line so that subsequent reverse movements thereof on minimum turning arcs will establish the vehicle in satisfactory parked position in a given space.

Another object of my invention is to provide a method of definitely locating a vehicle angularly with respect to a limiting line and at a corresponding distance therefrom so that subsequent reverse movement thereof on a minimum turning arc will establish the vehicle in predetermined spaced position from the line and parallel thereto, where space permits movement of the vehicle to the predetermined position.

Still another object of my invention is to provide means mounted upon the vehicle for establishing different lines or planes of sight coordinated with the specific geometric factors of the vehicle for use in parking the vehicle precisely in accordance with prescribed methods.

A further object of my invention is to provide plane of sight means forward of the driver's position in a vehicle, and line of sight means rearward thereof coordinated with the forward sight means and the left rearward turning center of the vehicle, in accordance with predetermined clearance limitations prescribed for parking the vehicle.

A still further object of my invention is to provide plane of sight means forward of the driver's position in a vehicle and plane of sight means rearward thereof, angularly coordinated, for determining the given length of a parking space relative to the length of the driver's vehicle.

Still another object of my invention is to provide plane of sight means rearward of the driver's position in a vehicle, the effective plane of sight extending in predetermined angular relation with respect to the right edge of the vehicle for pre-determining adequate clearance from a forward obstacle in a parking operation.

Other and further objects of my invention reside in the structure, methods and other provisions hereinafter more fully described with reference the accompanying drawings, in which:

Figure 1 is a plan view of a 1937 model automobile showing dimensions thereof which will be used to exemplify the system of my invention; Fig. 2 is a diagram of the simplest parking operation possible with the car shown in Fig. 1; Fig. 3 is a diagram showing the derivation of a point, a sight line and a plane of sight cooperative in the system of my invention; Figs. 4, 5, 6, 7 and 8 are diagrams showing the derivation of a clearance plane of sight and a minimum parking space as a complement to the point, the sight line and the plane of sight derived as shown in Fig. 3, Fig. 8 being on a larger scale than Figs. 4–7; Fig. 9 is a diagram showing the point, the two planes of sight and the minimum parking space derived from Figs. 3–8 applied, in combination, to the car shown in Fig. 1; Figs. 10 and 11 illustrate means provided in combination with the automobile of Fig. 1 for establishing the point, the two planes of sight and the minimum parking space shown in Fig. 9, plus the line of sight shown in Fig. 3; Figs. 12–14 illustrate the views provided by the means shown in Figs. 10 and 11;

Figs. 15-18 illustrate one method of modifying the system of my invention for more advantageous use in medium and large sized parking spaces; and Fig. 19 is a further development of the modifications indicated in Figs. 15-18.

The nature of the operation of parking a vehicle such as the common automobile in a space adjacent a curbing or other limiting line and between two obstacles such as other automobiles of comparative width, is so well known that division thereof into separate problems, as follows, will be readily understood:

(1) Determining that the length of the parking space is sufficient;

(2) Establishing satisfactory clearance from the obstacle forward of the parking space, hereinafter referred to as "car A";

(3) Establishing satisfactory clearance from, or relative angular relation to, the obstacle rearward of the parking space, hereinafter designated "car B"; and (4) Completing the operation by moving the automobile directly into final parked position from that established in the third step, or maneuvering the automobile between the obstructing cars A and B to final parked position, parallel to the curb or other limiting line and at a satisfactory distance therefrom.

It will be understood as this specification progresses that devices and methods used in these various steps are interrelated and cooperatively employed in the parking operation so that the problem is resolved into a precise system capable of functioning in accordance with prescribed directions to position the car consistently and certainly in satisfactory parked relation. For convenience, I will refer to the vehicle or automobile being parked as "car C"; and in order that the practicability of the invention may be appreciated, and by way of example, the methods and devices of my invention will be specifically disclosed as employed in combination with a popular sedan model automobile of the year 1937. Such car has been found to have the following dimensions and geometric factors pertinent to the system of my invention: Refer to Fig. 1:

| | |
|---|---|
| Overall width | 70" |
| Overall length | 15' 4" |
| Sections off corners: | |
| Off overall length | 7" |
| Off overall width | 14" |

(As the sections off the corners, formed by curved ends of the bumper guards provided on the car, may be of critical importance in the parking operation, cognizance is taken of them in these specifications.)

| | |
|---|---|
| Distance from rear bumper to center line of rear axle | 45" |
| Radius of minimum left backward turning circle that is tangent to the left edge of the car (minimum left forward turning circle is immaterial) | 12' 3" |
| Radii of minimum right turning circles that are tangent to the right edge of the car; two circles, forward and backward | 10' 9" |
| Distance that center of all left and right minimum backward turning circles are rearward of the rear axle | 6" |
| Distance that center of all right minimum forward turning circles is forward of the rear axle (left forward turning circles are immaterial in parking) | 6" |

It has been further determined that the outer side of the right hand tires are three inches within the overall edge of the body of the car, and that where a clearance from the curb of one inch to the body of the car is desired, the right tires will stand with four inches clearance. In the geometrical constructions to be employed, I assume a desired clearance of one inch from the body of the car, and assume therefore, a maximum left rearward turning radius normal to the longitudinal axis of the car of 12' 3" minimum, plus 70" overall car width, plus 1" clearance, giving a maximum radius of 18' 2".

Before proceeding to a specific description of the figures of the drawings, it will be noted that limiting points of intersection of the right rear tire with the curb have been determined as (1) 6" rearward of the rear axle at 4" from the outer edge of the car, and (2) 12" rearward of the rear axle at 5" from the outer edge of the car. The discrepancy in distance from the outer edge of the car is due to the taper and compression of the tire, and is of some importance as a factor affecting the results of the system in that it permits greater rearward movement of the car when right rear tire strikes curb while working the car into final position. The views of the right rear tire in Figs. 1 and 9 are accordingly shown as indicated.

In order to prevent any misunderstanding, hereinafter when I speak of "distance from curb" it will be understood that the distance of the bottom of the farthest right tire is intended. At a four-inch "distance from curb" therefore, there will normally be the one-inch clearance for the body of the car as above mentioned. And for purposes of setting a practical limit for the system, a maximum distance of ten inches from tires to curb will be allowed for car C, and a maximum distance of twenty inches from tires to curb will be alowed for cars A and B, car A being more critical than car B, as will be shown.

The figures are drawn substantially to scale; and it will be helpful in understanding the invention to prepare a tracing of the car C in the dimensions shown, designating the several turning centers, the point Z, the planes of sight and the right rear tire as shown substanially in Fig. 9. Such tracing may be worked over the diagrammatic figures using the centers indicated, and the operation of the system simulated.

Referring now to the drawings in detail, and deferring until later the problem of gauging the size of a space before parking, Fig. 2 diagrammatically shows the car of Fig. 1 with its left backward turning circle tangent with a curb line. As a result it is apparent that with the center $L_b$ fixed, the car may be backed from any angular position directly into parallelism with the curb. For any given angular position, a fixed point relative to the car may be established on the maximum left backward turning circle at the point of tangency of the curb line, as the point $z$ in Fig. 2.

For practical reasons, it is desirable that such a point $z$ be relatively close to the car both so that sighting means may be directed thereto and so that greater accuracy may be obtained. It will be understood, however, that any point on the left backward turning circle within sighting ease of the driver may be employed. Referring to Fig. 3, a point $Z'$ located on the circle in alignment with the right edge of the automobile, giving a tangent of 5½°, may be found more easy to sight from a right hand drive automobile, and is operable in the system. A point $Z''$ located on the circle in alignment with the left edge of the automobile, giving a tangent of 47½°, may be found more easy to sight from the cabs of trucks, busses and the like, and is operable in the system. Angles of 29° and 34° appear to be practical limits for the sedan type automobile considered, and with the particular sighting means and special methods I have employed in connection therewith.

The system of my invention may be enlarged and extended for parking on either side of the street, as for example, on one-way thoroughfares; and in such instances the same point Z may be used on either side if it be located at the intersection of the right and left backing arcs from the car, being the point Z''' in Fig. 3.

For purposes of description, a point Z determined by a 31° tangent to the left backing circle will be considered. In a direct parking operation similar to that illustrated in Fig. 2, therefore, and with car C angularly located at 31° with the curb, the 31° tangent would be established on the curb line, point Z then being in the same relation as point z in Fig. 2, and the car in position to back directly to within 4" of the curb (tire clearance).

Error in establishing the 31° angle relation is not critical, as shown by the following table of approximate discrepancies:

| Curb angle | Distance too close to curb |
| --- | --- |
| 20 degrees | 4 inches (zero tire clearance) |
| 21.5 degrees | 3 inches |
| 23.2 degrees | 2 inches |
| 25.5 degrees | 1 inch (zero car clearance) |
| 31 degrees | 0 inch (selected optimum) |
| 36.5 degrees | 1 inch (zero car clearance) |
| 38.8 degrees | 2 inches |
| 40.5 degrees | 3 inches |
| 42 degrees | 4 inches (zero tire clearance) |
| 43.3 degrees | 5 inches |
| 48.4 degrees | 10 inches |
| 52.4 degrees | 15 inches |
| 55.7 degrees | 20 inches |
| 58.7 degrees | 25 inches |
| 61.4 degrees | 30 inches |

From this table it is evident that any angle between 20° and 42° will permit the car to stop between 0" and 4" from the curb (tire clearance). I have shown chords at these limiting angles drawn on Fig. 3, and the 4" radial differences are evident, indicating the operative limits.

In order that the car may be positioned substantially at the required angle, a double provision is made. First, an independent plane of sight TU is established forward of the car at the angle of the selected tangent, 31° with respect thereto, and extends parallel to the curb line with the car in the desired angular position. The second provision is an arrangement of indicia lines at the limiting angles of 20° and 42°, intersecting and providing a sight for point Z. When point Z falls at the intersection of these lines, (which will be further defined,) the curb line should be sighted as a bisector, at the desired 31° or at any angle between the 20° and the 42° lines. Thus, point Z may be readily established on the curb line with the car anywhere within an 11° tolerance under or above the prescribed angle, and the car backed directly to position adjacent the curb line.

It can readily be determined that the above described procedure requires a minimum parking space about seven feet longer than the car. In employing the sight elements above defined in this minimum space, and for parking operations in much smaller spaces, a coordinated clearance line is required. When direct parking is not possible because of a shorter space, maneuvering the car by a zig-zag process into the space is inescapable. This operation, however, is reduced to a near minimum and to a definite procedure in the system of my invention so that trial and disappointment are eliminated and the operation is successfully accomplished in the first execution. The theoretical minimum space required is governed by a diagonal measurement of the car; by the system of my invention it has been proved possible, by using a point Z located at 29° on the left backing turning circle, to park a car promptly in a space just 3" longer than this minimum, or 8" longer than the car. For practical considerations, however, a minimum desirable space such as to require little maneuvering or zig-zaging will be assumed as 1½' longer than the car itself, this being the minimum parking space that is satisfactory for all assumed conditions when point Z is located at the prescribed position of 31° on the left backing turning circle, as will be proved later. In addition to the minimum parking space, the clearance line also varies when the position of point Z is shifted on the left backing turning circle. The clearance line and the minimum parking space will accordingly be derived for point Z at the prescribed position of 31° on the left backing turning circle, both the clearance line and the minimum parking space to be effective at the height of the average bumper guard.

Referring to Figs. 4–8, satisfactory clearance for car C with respect to car A is dependent upon the distance car C is initially disposed to the left of car A, a further forward position of car C being allowable as car A is farther from the curb line. A minimum lateral spacing of two feet between car A and car C will be considered in Figs. 4–8. Fig. 4 shows car A abutting the curb and point F relative to car C establishes the position affording minimum clearance for car C in its left backing movement, after the car has been angularly positioned with point Z on the curb line by right backing movement about the center $R_b$, Fig. 1. (If a tracing of Fig. 9 is superimposed on car C, movement on the respective centers can be effectively visualized; and such tracing may be similarly employed on Figs. 5–7.)

Fig. 5 shows car A at the maximum anticipated distance of 20" (tire clearance) from the curb line and the same point F relative to car C employed to establish the initial position of car C. The result on the left backing movement shows a wider clearance space, which, of course, is feasible.

Figs. 4 and 5, for reasons which will be apparent in Fig. 8, are now used to derive the minimum parking space for the condition where point Z is at the prescribed position of 31° on the left backing turning circle. This is accomplished by varying the size of the parking space in both figures and tracing out the resultant parking operations until final position in Fig. 4 is satisfactory and final position in Fig. 5 just meets assumed requirements of 10 inches from curb (tire clearance). The minimum parking space so derived is the assumed minimum parking space shown, namely 1½ feet longer than car C, as previously noted at the time of assuming this minimum parking space, and as is plainly evident inasmuch as the final position in Fig. 4 is satisfactory and the final position in Fig. 5 just meets assumed requirements of 10 inches from curb (tire clearance). If the derived minimum parking space were larger than the assumed minimum parking space it would be necessary at this point either to retrace our steps and assume the larger minimum parking space, or to retrace our steps and assume a lesser angular position of point Z on the left backing turning circle which would result in a smaller derived minimum parking space in the construction just completed in Figs. 4 and 5.

Fig. 6 shows car A in the same position as Fig. 5 and point H relative to car C establishes the position affording minimum clearance for car C in the left backing movement. It will be apparent, however, that with car A abutting the curb as in Fig. 4, and car C positioned in accordance with point H, inadequate clearance will be afforded. Point H, it will be noted, is relatively farther to the rear of car C than is point F.

Fig. 7 shows car A in the same position as Fig. 4 and point G relative to car C establishes the position affording the maximum clearance for car C in the left backing movement that will result in a final parked position which just meets assumed requirements of 10 inches from curb (tire clearance).

With two feet initial lateral spacing between cars A and C and with car A abutting the curb, the left rear corner of car A may therefore be located at any point between point G and point F relative to car C. With two feet initial lateral spacing between cars A and C and with car A 20 inches from the curb, the left corner of car A may be located at any point between point F and point H relative to car C. Accordingly with two feet initial lateral clearance between cars A and C and with car A zero to 20 inches from the curb, the left rear corner of car A may be located at point F relative to car C, resulting in satisfactory parking in all cases.

Points F, G and H are now plotted on the two foot lateral relative to car C in Fig. 8. Applying the same procedure outlined in Figs. 4–7 with car C spaced three, four and five feet from car A, points affording clearances like those with points F, G and H are determined. Since no further derivation of a minimum parking space is required, it will be noted that point F separates into two points on these other laterals, one for minimum clearance for car C in the left backing movement when car A is abutting the curb, and one for the maximum clearance for car C in the left backing movement when car A is 20 inches from the curb that will result in a final parked position which just meets assumed requirements of 10 inches from curb (tire clearance).

The results are plotted as curves in Fig. 8; lines FK and GI relating to clearances with car A abutting the curb, as in Figs. 4 and 7; and lines FJ and HL relating to clearances with car A 20 inches from the curb, as in Figs. 5 and 6. Lines FJ and FK are the critical limits in that with car A zero to 20 inches from the curb and car C 2 to 5 feet from car A, left rear corner of car A may be located anywhere between lines FJ and FK relative to car C and be in a satisfactory position from which to proceed in the parking operations of my invention. Line FK being the rear determinant, any plane of sight established through point F at a greater angle with respect to car C, up to the forward determinant FJ, would be satisfactory. As it is desirable to permit as much clearance as is feasible, a "clearance line" MN as shown in Fig. 8, is selected to include point F for the two-foot spacing condition, and allow increased clearance as the spacing is increased. This is somewhat in the nature of a precaution against misjudgment of the sight from the further spaced location and assures adequate clearance in all assumed instances. It will be understood that the clearance line MN is considered at the height of the average bumper guards, which are the limiting points to be considered. As derived and selected, the line MN is seen to extend at an angle of approximately 59° with respect to the vehicle, from a point approximately 20" to the rear of the rear axle.

Fig. 9 as has hereinbefore been indicated, illustrates simply the three coordinated sight factors as derived in Figs. 1–8. From fundamental geometric considerations, it will be apparent that point Z can be viewed by a single line of sight, whereas lines MN and TU may be considered to lie in planes of sight. From Fig. 9, it is evident that a line VW may be taken between the lines MN and TU at points of average bumper height and spaced a distance equal to the minimum assumed parking space, one and one-half feet longer than the length of the car; and thus by providing means for establishing the points V and W in the respective planes of sight, the elements already provided may be employed also in judging the relative size of the parking space. In the arrangement shown, any space which is larger than the space sighted between lines MN and TU, when the car is laterally spaced with respect to the outer edge of the space, is sufficient.

Fig. 10 in plan and Fig. 11 in side elevation indicate one embodiment of my invention in means mounted on the automobile considered in the preceding specifications. Means are provided for sighting point Z and comprise a mirror $h$ mounted on the ceiling of the automobile in substantially the relative position shown on Fig. 10. A marker angle $i$, formed by lines painted on the mirror $h$ at 20° and 42° respectively with the longitudinal axis of the car, is employed in connection with a marker line $j$ painted on the rear window of the car to project at 31° relative to the longitudinal axis of the car to further aid in locating the curb line. The cooperation of angle $i$ and line $j$, as reflected in the mirror $h$ is shown in Fig. 12, and the envisioned location of point Z at the apex of the lines, and of the curb line in the direction of line $j$, are indicated.

Line TU is embodied in a plane of sight established by a vertical rod marker $a$ fixed to the right splash guard at the position indicated on Fig. 11 and an index centrally located on a wing-shaped marker $c$ painted on the windshield at approximately the position shown on Fig. 10 to establish the 31° angle with respect to the side of the car, as noted. The vertical plane, $a$TU, thus established is shown more clearly in Fig. 11 and can be visualized from the enlarged showing in Fig. 13 of aligned rod marger $a$ and $c$. Line TU is established at the intersection of an inclined plane $cb$ with the vertical plane $a$TU. As clearly shown in Fig. 13, the wing-shaped marker $c$ has a linear top edge substantially horizontally disposed, and together with a movable index marker $b$ on rod $a$ establishes the second plane of sight to fix line TU. Marker $b$ is movable in the initial adjustment only to fix point W at the position defined and afterwards remains fixed. The direction of plane $a$TU thus may be easily sighted by line T$b$U, and at the same time this line is available to sight a point W for judging the size of the parking space as explained.

Referring to Figs. 10, 11 and 14, line MVN is embodied in a vertically and horizontally inclined plane established by a linear marker $g$ painted the right side rear window of the automobile and a point index $e$ described within a small painted circle on a second mirror $d$, mounted on the ceiling of the automobile at approximately the position shown on Fig 10, the plane of sight being arranged by suitably coordinating the line $g$ and the point $e$, to extend horizontally at the prescribed angle, (taken to be 59° as derived in Figs. 4-8) and vertically at such an angle, dependent upon the structure of the automobile, as to include the line MVN substantially at the height of the average bumper guard, and in the relative longitudinal position disclosed. The plane $eg$ is envisioned as shown in Fig. 14, and the direction of forward movement of the automobile is indicated by the arrow. The car C is stopped when the rear bumper of a car A is seen to adjoin the marker $g$ at any position within the range of vision, dependent upon the lateral spacing of car C from car A.

Point V is sighted along a line in plane $eg$ as determined by an intersecting plane $ef$ established by the point index $e$ and a short linear marker $f$ painted across marker $g$. The plane $eg$ extends normal to the side of the car but inclined to ground, and line $g$ is disposed at an angle to line $f$ less than the complement of the angle of line MN, i. e., less than 31°, as determined by the plane of the window in the car structure. The proportions of lines $f$ and $g$ are shown somewhat exaggerated in Fig. 11, the envisioned view thereof in mirror $d$ is shown in Fig. 14, line $f$ appearing normal to the direction of movement and disposed to align with the front bumper guard of a car B at point V. If point W lies on the rear bumper guard of corresponding car A, or plane $cb$ sights below the bumper guard, at the same time point V lies on the front guard of car B, the space is known to be sufficiently long for the use of my system as applied.

In general, it is advisable to approach cars A and B about three feet laterally displaced, from which position points W and V are easily sighted relative to cars A and B respectively. Having discovered as above described, that the space is long enough, the driver runs the car forward until the rear bumper of car A sights next to line $g$ in mirror $d$. Then, with steering wheels hard to the right, the car is backed on center R$b$ until point Z coincides with the curb line (it is presumed in this operation that the space is too short for direct parking as in Fig. 2, and the angle $i$ and line $j$ serve only to define point Z,); the steering wheels are then turned hard left and the car backed on center L$b$ until stopped by abutment of the right rear tire with the curb, or by the bumper guards on cars B and C. At this time the car is in optimum position for maneuvering about centers R$f$ and L$b$, with wheels hard right and hard left, respectively, to a final satisfactory position. The foregoing operations can be simulated with a tracing of Fig. 9 in a variety of parking spaces of different lengths and with differently positioned cars A, within the anticipated lateral limits defined, showing the universal operation of my invention for all practical purposes.

There remains, however, a further provision to be made in the system. It will be noted that by using point Z as described in parking in spaces substantially longer than the minimum assumed, the entire space is not utilized and an unnecessary amount of zig-zagging results. The procedure for parking in larger spaces should permit a measure of straight backing instead of backing full right from a fixed position relative to car A to a fixed position relative to curb, and accordingly a definite point of aim with reference to car B is provided in order that the space be more advantageously entered.

Prior to determining the exact minimum clearance from car B that is required to meet all conditions it should be noted that the desired functions of this clearance are threefold, namely: (1) to permit direct parking where sufficient space is available with no zig-zagging in such cases; (2) to provide for sufficient clearance from car B to permit car C to reach both an initial and final position in close to curb; and (3) to provide against aiming too far back from car A while at a high angle with curb, in which case the zig-zagging would leave own car C parallel with curb but too far out from curb.

As operations in larger than minimum spaces are not so critical, and satisfactory parking can be effected therein from a number of angular positions, the point of aim is designated as any point clear of car B by at least three feet, sighted along the left side of car C. I have found that this arrangement is simple, and wholly satisfactory in adapting the more precise sighting means of my invention for parking in larger spaces with less zig-zagging. I have illustrated in Figs. 15-18 how the modified practice is employed in spaces of different lengths.

Fig. 15 shows car C parking from the maximum angle which permits direct parking, namely 42°, with car initially located just far enough ahead of car B to permit satisfactory parking with no zig-zagging, resulting in right front corner just meeting assumed requirements of ten inches from the curb (tire clearance). The 2'2" clearance sighted along the left edge of car C, from car B, is well within the 3' designated and is the maximum required clearance for direct parkings, as lesser angles of car C with curb decrease the clearance, as is readily seen.

Here it may be noted that the 2'2" figure represents the maximum clearance required for the model car considered, and the three foot clearance designated is an arbitrary figure which it is believed will not be exceeded as a maximum for any vehicle to which the system of my invention is applied. More particularly, the three foot clearance is selected as approximately one-half the car width.

Figs. 16, 17 and 18 show that the 2'2" sight clearance from car B permits satisfactory use in different size spaces. In practice, the car C is located relative to car A by clearance line MN, Fig. 8, as already undrestood, and backed on center R$b$ until the left side of car sights clear of car B by at least three feet, the 2'2" spacing illustrated being optimum for the car considered. The car C is then backed straight until point Z sights on the curb line, as already explained, and the prescribed procedure is continued from this position. From Figs. 16-18, it will be noted that the distance of straight backing increases with the length of available space, under similar starting conditions, and that the approach angle with curb correspondingly decreases.

Fig. 19 illustrates the effect on the clearance of corner point $n$ from car A caused by straight backing at various angles intermediate the right and left backing arcs. Rather advantageously than adversely, the clearance is increased when straight backing is introduced and is more pronounced the longer is the straight component. Fig. 19 illustrates the worst clearance possibilities, namely, with car A abutting the curb and car C only two feet laterally spaced from car A, so that it is apparent that clearances in all other contemplated relations will be more than sufficient.

As a general rule then, pursuant to the determination that the parking space is at least of the minimum required length, it might be stated that the prescribed procedure is as follows:— approach parallel to curb, about ½ car width out from car A (2 to 5 feet satisfactory), until plane of sight $eg$ sights next to rear bumper of car A; turn steering wheels full right and back to any position between left side of car C sighting clear of car B by at least ½ car width (if such occurs first) and point Z sighting on the curb line, backing straight thereafter until point Z sights on the curb line; turn steering wheels full left and either back directly or zig-zag into final parking position. This in brief, is the preferred manner of accomplishing satisfactory parking in any given minimum or larger space in accordance with the principles of my invention.

I am aware that modifications may be made to locate the vehicle more accurately with respect to the curb at a variety of angles for more efficient operation, notably the establishment of a segmental conical plane of sight with apex at $i$ and base circumference on the left backing arc; but I prefer to employ simply the point Z on that arc, as the operation of the system is greatly simplified. The modification indicated, however, and others of structure and procedure are contemplated and it is expected may be made in adapting the system of my invention to various models of automotive vehicles.

It might be noted further that generally the vehicle will occupy a position closer to the curb if the parking operation is begun from a lateral position farther from car A, because center Lb will generally be established closer to the curb line for all maneuvering operations than would be the case if smaller spacings from car A are initially assumed. Results are quite satisfactory, however, with any spacing between the two to five foot limits considered.

In order to aid in the use of my invention in darkness, dual spot-light means are provided at $k$ in Fig. 10. The rear beam of spot-light $k$ is focused on the ground at point Z, and illuminates the adjacent area by diffused light. The side beam of spot-light $k$ is focused on the ground at the intersection of line $eV$ therewith so that point V, at bumper height, will appear in relief against the lighted ground area incidental to this beam from spot-light $k$. The fender marker $a$ may be of the type available on the market, certain of which have illuminated header members for night use, although sufficient light is available from the head lamps of the car shown to silhouette fender marker $a$ and marker $b$ in the positions indicated; marker $b$ on the rod $a$, however, is a novel feature in the system of my invention. It will be further noted that fender marker $a$ may be installed at various points on the right front fender, engine hood or cowling, provided that fender marker $a$ lies in plane TaU and index marker $b$ lies on line TbWU as shown.

It will be understood that the devices as illustrated in Figs. 10–14 represent but one embodiment of my invention and that markers and mirrors may be selectively mounted in any convenient position on the vehicle so as to establish the lines and planes of sight required in accordance with my invention, principally to define point Z and lines MN and TU. The devices designed for a particular vehicle may best be applied by jigs at the factory or a service station, but may be applied by anyone in accordance with specific measurements and instructions prepared according to the principles of my invention for various specifications.

The painted marks $e$ and $i$ on mirrors $d$ and $h$ are preferably made on the silvered sides of the mirrors to eliminate double images. The various markers may be differently colored, individually or in cooperative grouping, for facilitating recognition thereof, but short practice with the system of my invention will familiarize one completely with its operation.

The system of my invention is inexpensive to manufacture, and the elements thereof may be preformed for the most part in conjunction with the element of the automobile or other vehicle with which the system is coordinated and assembled as a part thereof in mass production operations. The arrangement is simple in its constitution and requires no special knowledge on the part of the driver for its use. While the methods and devices herein disclosed have proved highly efficient in practice and comprise a present preferred embodiment of my invention, I desire it to be understood that modifications may be made therein and that no limitations upon my invention are intended, except as are imposed by the scope of the appended claims.

What I claim as new and desire to secure by Letters Patent of the United States is as follows:

1. A method of parking an automobile parallel to a given line; said automobile being provided with a pair of spaced sighting means substantially rearward of the driving position and optically alignable from the driving position for defining a fixed point in the ground plane rearward and within the transverse limits of the automobile and spaced from the left turning center of the automobile a distance equal to the desired distance of the given line from said center with the automobile in parked position; which method includes running the automobile about its right turning center, and utilizing said means by registering the coincidence of said point with said line to determine a limiting position for altering the direction of movement of the automobile.

2. A method of parking an automobile parallel to a given line; said automobile being provided with a pair of spaced sighting means substantially rearward of the driving position and optically alignable from the driving position for defining a fixed point in the ground plane rearward and within the transverse limits of the automobile and spaced from the left turning center of the automobile a distance equal to the desired distance of the given line from said center with the automobile in parked position, said automobile also being provided with a pair of spaced sighting means substantially forward of the driving position and optically alignable from the driving position for determining a line of sight forward of the automobile on a line normal to a line between said center and said point; which method comprises running the automobile about its right turning center, utilizing the last said means by observing parallelism of said line of sight and the given line to determine a limiting angular position of the automobile with respect to the given line, utilizing the first said means by registering coincidence of said point with the given line to determine a limiting spacial position of the automobile with respect to the given line, and running the automobile about its left turning center from said limiting spacial position to parked position in parallel with the given line.

3. A method of parking an automobile parallel to a given line; said automobile being provided with a pair of spaced sighting means substantially rearward of the driving position and optically alignable from the driving position for defining a fixed point in the ground plane rearward and within the transverse limits of the automobile and spaced from the left turning center of the automobile a distance equal to the desired distance of the given line from said center with the automobile in parked position, said automobile also being provided with a pair of spaced sighting means substantially forward of the driving position and optically alignable from the driving position for determining a line of sight forward of the automobile on a line normal to a line between said center and said point, said automobile being further provided with a pair of spaced sighting means substantially lateral of the driving position and optically alignable from the driving position for determining a clearance sight plane laterally from the right side of the automobile adjacent the rear thereof; which method comprises utilizing the last mentioned means by observing concurrence of said clearance sight plane with the obstacle forward of the parking space to determine a starting position of the automobile, running the automobile about its right turning center, utilizing the second mentioned means by observing parallelism of said line of sight and the given line to determine a limiting angular position of the automobile with respect to the given line, utilizing the first said means by registering coincidence of said point with the given line to determine a limiting spacial position of the automobile with respect to the given line, and running the automobile about its left turning center from said limiting spacial position to parked position in parallel with the given line.

4. A method of parking an automobile parallel to a given line; said automobile being provided with a pair of spaced sighting means substantially rearward of the driving position and optically alignable from the driving position for defining a fixed point in the ground plane rearward and within the transverse limits of the automobile and spaced from the left turning center of the automobile a distance equal to the desired distance of the line from said center with the automobile in parked position; said automobile being further provided with a pair of spaced sighting means substantially lateral of the driving position and optically alignable from the driving position for determining a clearance sight plane laterally from the right side of the automobile adjacent the rear thereof; which method includes utilizing the last mentioned means by observing concurrence of said clearance sight plane with the obstacle forward of the parking space to determine a starting position of the automobile, running the automobile about its right turning center, and utilizing the first mentioned means by registering the coincidence of said point with said line to determine a limiting position for altering the direction of movement of the automobile.

5. Means for directing the driver of a vehicle for parking said vehicle in a given space which comprise, in combination, a pair of spaced sighting means arranged substantially forward of the driving position and optically alignable from the driving position for establishing a vertical plane of sight forward of said vehicle at an acute angle with respect to the longitudinal axis of said vehicle, and a pair of spaced sighting means arranged substantially rearward of the driving position and optically alignable from the driving position for sighting a point in the plane of support of said vehicle coordinated by an arc of a radius extending to the right side of the vehicle on a line normal thereto from a center at the left turning center of said vehicle and by a tangent to said arc parallel to the aforesaid plane of sight.

6. The combination set forth in claim 5 and including a pair of spaced sighting means arranged substantially lateral of the driving position and optically alignable from the driving position for establishing a second plane of sight laterally of said vehicle and at an angle with respect to the longitudinal axis of the vehicle, for use in establishing an initial clearance position of said vehicle from which to begin parking operations.

7. In an automotive vehicle, means for directing the driver in parking said vehicle comprising marker means on the windshield thereof and second marker means fixed to the front right splash guard thereof along a line having a horizontal angular component with respect to the longitudinal axis of said vehicle and a vertical angular component with respect to the ground; third marker means on the rear window of said vehicle, and a mirror having fourth marker means thereon mounted on the ceiling of the body of said vehicle, a line through said third and fourth marker means intersecting the ground rearward of said vehicle at a point; and fifth marker means on the right hand rear window of said vehicle, and a second mirror having sixth marker means thereon mounted on the ceiling of the body of said vehicle, a line through said fifth and sixth marker means having a selected horizontal angular component with respect to the longitudinal axis of said vehicle at a predetermined position with respect to the length of said vehicle and a predetermined vertical angular component with respect to the ground; the line of the first mentioned and said second marker means being disposed in selected longitudinal position with respect to the line of said fifth and sixth marker means, so that selected points correspondingly located along said lines with respect to ground are spaced at least equal to a minimum desired length of parking space; and said point on the line of sight of said third and fourth marker means being located on an arc centered at the left turning center of the vehicle and beyond a distance equal to a minimum desired clearance, a tangent to said arc in the same horizontal angular relation as the line of the first mentioned and said second marker means with respect to the longitudinal axis of said vehicle determining the said point by the point of tangency thereof on said arc.

8. In an automotive vehicle, means for directing the driver in parking said vehicle comprising a wing-shaped marker on the windshield thereof, the top edge of said marker extending horizontally and the middle thereof depending as an index, a rod marker vertically mounted on said vehicle forward of the windshield and having an index marker mounted thereon; said markers being arranged so that a vertical plane established by said rod marker and the index of said wing-shaped marker extends at a horizontal angle with respect to the longitudinal axis of said vehicle, and a plane established by the top edge of said wing-shaped marker and said index marker extends downwardly at a vertical angle with respect to the ground, the line of intersection of said planes being projectible visually as a point to a driver of said vehicle.

9. In an automotive vehicle, means for directing the driver in parking said vehicle comprising a linear marker on the rear window thereof, having a horizontal angular component with respect to the longitudinal axis of said vehicle, and a mirror mounted on the ceiling of the body of said vehicle and having a pair of intersecting linear markings thereon lying in vertical planes having horizontal angular components respectively greater and less than the horizontal angular component of the aforesaid linear marker with respect to the longitudinal axis of said vehicle; all said linear markings being arranged so that a line established by the point of intersection of said pair of linear markings and a point at one end of said linear marker intersects ground at a fixed point rearward of said vehicle.

10. In an automotive vehicle, means for directing the driver in parking said vehicle comprising a pair of crossed linear markers on the right hand rear window thereof, and a mirror having a point index thereon mounted on the ceiling of the body of said vehicle; said linear markers being projectible to the plane of said mirror with the point of their crossing coinciding with said point index, with one of said linear markers extending in a vertical plane normal to the longitudinal axis of said vehicle, and with the other of said linear markers extending in a vertical plane disposed at a horizontal angle with respect to the longitudinal axis of said vehicle.

11. In an automotive vehicle, means for directing the driver in parking said vehicle comprising a pair of crossed linear markers on the right hand rear window thereof, and a mirror having a point index thereon mounted on the ceiling of the body of said vehicle; said point index and said linear markers being disposed in relation to each other and to said vehicle and operative in combination to establish by said point index and one of said linear markers a first plane of sight extending at an incline having a horizontal angular component with respect to the longitudinal axis of said vehicle in a selected position with respect to the length of said vehicle, and to establish by said point index and the other of said linear markers a second plane of sighting extending at an incline having a vertical angular component with respect to the ground, the line of intersection of said planes being projectible visually as a point to the driver of said vehicle.

12. In an automotive vehicle, means for directing the driver in parking said vehicle comprising a wing shaped marker on the windshield thereof, the top edge of said marker extending horizontally and the middle thereof depending as an index, and a rod marker vertically mounted on said vehicle forward of the windshield and having an index marker mounted thereon; said wing-shaped marker, said rod marker and said index marker being arranged so that with said index and said index marker coinciding, in visual projection, the top edge of said wing-shaped marker and said rod marker are normal to each other.

13. A method of parking an automobile parallel to and on either the left or the right of a given line; said automobile being provided with a pair of spaced sighting means substantially rearward of the driving position and optically alignable from the driving position for defining a fixed point in the ground plane rearward of the automobile, spaced from the left turning center of the automobile a distance equal to the desired distance of the given line from said center with the automobile parked on the left of said line, and spaced from the right turning center of the automobile a distance equal to the desired distance of the given line from said right turning center with the automobile parked on the right of the said line; which method includes backing the automobile about one of its turning centers in the direction of the given line, and utilizing said means by registering the coincidence of said point with said line to determine a limiting position for altering the direction of movement of the automobile.

14. In a system for parking an automobile parallel to a given line, a pair of spaced sighting means arranged substantially lateral of the driving position in relation to the turning radii and the dimensions of said automobile, said means being optically alignable from the driving position for defining a plane of sight for view by the driver to establish a limiting longitudinal clearance position of the automobile for parking, a second pair of spaced sighting means arranged substantially forward of the driving position and optically alignable from the driving position for defining a line of sight for view by the driver to establish a limiting angular position of the automobile with respect to the given line, and a third pair of spaced sighting means arranged substantially rearward of the driving position in relation to the left turning radius and the clearance desired from the given line and with respect to said limiting angular position, said third sighting means being optically alignable from the driving position for defining a ground point for view by the driver to establish a limiting spacial position of the automobile with respect to the given line; said second and third optical means being coordinated with respect to the given line with said line of sight parallel to said given line when said ground point coincides with said given line and the automobile is in the desired limiting angular position; the automobile being maneuverable in straight lines and in definite arcuate paths about its right and left turning centers through the said limiting position into final parked position.

15. A system for parking an automobile parallel to a given line, said automobile having definite right and left turning radii about centers fixed with respect to the automobile and definite dimensions governing the area required for parking, said system comprising, in combination with said automobile, pairs of spaced means fitted to said automobile substantially laterally, forwardly and rearwardly of the driving position and arranged in cooperable relation to said radii and said dimensions and in respect to said given line, said means being optically alignable from the driving position for establishing limiting clearance, angular and spacial positions, respectively, of said automobile in the operation of said system, said automobile being maneuvered in straight lines and in definite arcuate paths about said centers through the said limiting positions into final parked position.

16. A method for parking an automobile parallel to a given line; said automobile having definite right and left turning radii about centers fixed with respect to the automobile and definite dimensions governing the area required for parking, and being provided with pairs of spaced sighting means fitted to the automobile substantially laterally, forwardly and rearwardly of the driving position and arranged, in respect to said given line, in cooperable relation to said radii and said dimensions and optically alignable from the driving position for establishing limiting clearance, angular and spacial positions, respectively, of said automobile; which method comprises locating the automobile in said limiting clearance position, and maneuvering said automobile in straight lines and in definite arcuate paths about said centers through the said limiting angular and spacial positions into final parked position.

ARNOLD J. ISBELL.